US008624516B2

(12) United States Patent
Kim et al.

(10) Patent No.: US 8,624,516 B2
(45) Date of Patent: Jan. 7, 2014

(54) POWER SUPPLY APPARATUS FOR LIGHT EMITTING DIODE

(75) Inventors: Ui Jong Kim, Seoul (KR); Min Ho Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 269 days.

(21) Appl. No.: 13/164,308

(22) Filed: Jun. 20, 2011

(65) Prior Publication Data

US 2012/0013264 A1    Jan. 19, 2012

(30) Foreign Application Priority Data

Jul. 15, 2010    (KR) .................. 10-2010-0068720

(51) Int. Cl.
*H05B 37/02* (2006.01)

(52) U.S. Cl.
USPC ........... 315/224; 315/219; 315/247; 315/291; 315/308; 363/21.01; 363/21.12; 363/89; 363/97; 363/131

(58) Field of Classification Search
USPC ............. 315/209 R, 219, 224, 247, 291, 297, 315/307, 308; 363/5, 16, 21.01, 21.12, 89, 363/95, 97, 131

See application file for complete search history.

(56) References Cited

U.S. PATENT DOCUMENTS

| 6,201,713 | B1 * | 3/2001 | Hosotani .................. 363/19 |
| 6,903,945 | B2 * | 6/2005 | Kitano .................. 363/21.01 |
| 2009/0251925 | A1 * | 10/2009 | Usui et al. .................. 363/16 |

* cited by examiner

*Primary Examiner* — Douglas W Owens
*Assistant Examiner* — Thai Pham
(74) *Attorney, Agent, or Firm* — Saliwanchik, Lloyd & Eisenschenk

(57) ABSTRACT

A power supply apparatus for LED is provided. The power supply apparatus for LED includes a detector, a voltage dropper, and a control switch. The detector detects whether an LED is connected to the power supply apparatus. The voltage dropper drops a voltage applied to the LED. The control switch is connected to the voltage dropper in parallel, and changes a path of a power applied to the LED according to the detected result of the detector. Accordingly, the power supply apparatus for LED compensates for a low impedance of an LED to an impedance equal to or higher than a predetermined impedance at a time when connection of the LED is detected, thereby inhibiting an overcurrent from flowing in the LED.

11 Claims, 1 Drawing Sheet

POWER SUPPLY APPARATUS FOR LIGHT EMITTING DIODE

CROSS-REFERENCE TO RELATED APPLICATION

This application claims the benefit under 35 U.S.C. §119 of Korean Patent Application No. 10-2010-0068720, filed on Jul. 15, 2010, which is hereby incorporated by reference in its entirety.

BACKGROUND

The present disclosure relates to a power supply apparatus for Light Emitting Diode (LED), and more particularly, to a power supply apparatus for LED, which protects an LED from an overcurrent that is momentarily generated when the LED is connected to the power supply apparatus for LED.

In installing a lighting device, generally, the lighting device is installed in a state where an input power has been disconnected, and thereafter, the power is applied.

However, due to the working environment, a lighting device may be sometimes required to be installed while a power is being supplied continuously. In this case, a power supply apparatus for a lighting device operates in a no-load state.

FIG. 1 is a circuit diagram illustrating a related art power supply apparatus for LED.

As illustrated in FIG. 1, when a lighting device such as an LED 2 is mounted on a power supply apparatus 1 for LED, a high current rapidly flows in the LED 2 because energy stored in the power supply apparatus 1 for LED is momentarily applied to the LED 2 due to the low impedance of the LED 2. Particularly, as the number of LEDs 2 is reduced, a higher surge current flows in the LED 2.

Therefore, a current flowing in the LED 2 is rapidly increased and thus deviates from a normal range, thereby damaging the LED 2. Due to this, the service life of the LED 2 is shortened.

Moreover, when the current deviating from the normal range flows, the current does fatal damage to the power supply apparatus 1 for LED as well as the LED 2, thereby threatening a user's safety.

BRIEF SUMMARY

Embodiments provide a power supply apparatus for LED, which compensates for a low impedance of an LED to an impedance equal to or higher than a predetermined impedance until before a constant current of the LED is controlled from a time when the LED is connected thereto, in a case where the LED is connected to the power supply apparatus for LED, thereby inhibiting an overcurrent from flowing in the LED.

The object of the present invention is not limited to the aforesaid, but other objects not described herein will be clearly understood by those skilled in the art from descriptions below.

In one embodiment, a power supply apparatus for Light Emitting Diode (LED) includes: a detector detecting whether an LED is connected to the power supply apparatus; a voltage dropper dropping a voltage applied to the LED; and a control switch connected to the voltage dropper in parallel, and changing a path of a power applied to the LED according to the detected result of the detector.

The path of the power may include a first path comprising the voltage dropper, and a second path comprising no voltage dropper, and the control switch may be selectively turned on or off according to the detected result of the detector and changes the path of the power applied to the LED.

The detector may compare the voltage applied to the LED and a predetermined first reference voltage to detect whether the LED is connected.

The detector may detect the LED as connected when the voltage applied to the LED is higher than the predetermined first reference voltage, or detect the LED as not connected when the voltage applied to the LED is lower than the predetermined first reference voltage.

The detector may include: a voltage divider dividing the voltage applied to the LED; and a regulator comparing the divided voltage and a second reference voltage to detect whether the LED is connected according to the compared result of the voltages.

The regulator may be turned on when the LED is detected as connected, or turned off when the LED is detected as not connected.

The regulator may be turned on when the divided voltage is higher than the second reference voltage, and the control switch may be turned off according to the turned-on of the regulator and allow a current, flowing through a path including the voltage dropper, to flow into the LED.

The regulator may be turned on when the divided voltage is lower than the second reference voltage, and the control switch may be turned on according to the turned-off of the regulator and allow a current, flowing through a path comprising the control switch, to flow into the LED.

The power supply apparatus may further include: a first switch having a gate terminal connected to a cathode terminal of the regulator, and a source terminal connected to a ground terminal; and a second switch having a gate terminal connected to a drain terminal of the first switch.

The first switch may be turned off according to the turned-on of the regulator, and the second switch may be turned on according to the turned-off of the first switch.

The control switch may be turned off according to the turned-on of the second switch and allow a current, which flows through a path comprising the voltage dropper, to be applied to the LED.

The first switch may be turned on according to the turned-off of the regulator, and the second switch may be turned off according to the turned-on of the first switch.

The control switch may be turned on according to the turned-off of the second switch and allow a current, which flows through a path comprising the control switch, to be applied to the LED.

The details of one or more embodiments are set forth in the accompanying drawings and the description below. Other features will be apparent from the description and drawings, and from the claims.

DETAILED DESCRIPTION

Figure 1:
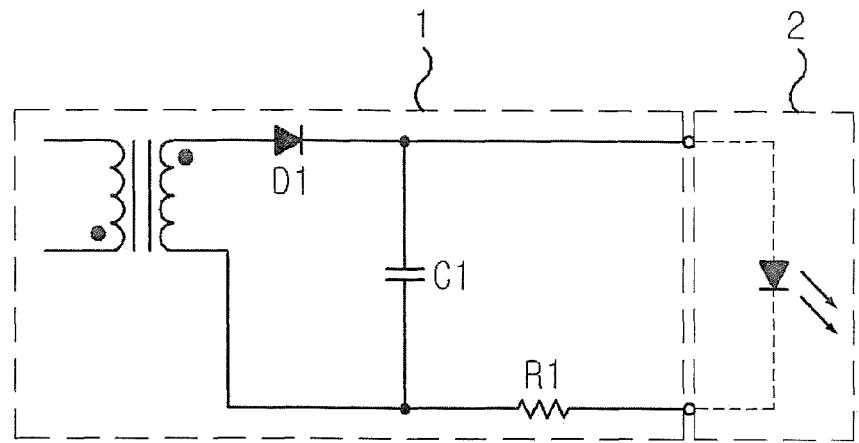
FIG. 1 is a circuit diagram illustrating a related art power supply apparatus for LED.

The present invention may be variously modified and have several embodiments, and thus, specific embodiments are illustrated in drawings and will be described.

Thus, it is intended that the present invention covers the modifications and variations of this invention provided they come within the scope of the appended claims and their equivalents.

Terms like a first and a second may be used to describe various elements, but the elements should not be limited by the terms. The terms may be used only as object for distinguishing an element from another element. For example, without departing from the spirit and scope of the inventive concept, a first element may be referred to as a second element, and similarly, the second element may be referred to as the first element. As used herein, the term and/or includes any and all combinations of one or more of the associated listed items.

It will also be understood that when an element is referred to as being 'on' another element, it can be directly on the other element, or intervening elements may also be present. Further, it will be understood that when an element is referred to as being 'under' another element, it can be directly under, and one or more intervening elements may also be present. In addition, it will also be understood that when an element is referred to as being 'between' two elements, it can be the only element between the two elements, or one or more intervening elements may also be present.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Unless terms used in embodiments of the inventive concept are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Reference will now be made in detail to the embodiments of the present disclosure, examples of which are illustrated in the accompanying drawings. To enable easy understanding in describing the present invention, like reference numerals refer to like elements throughout.

Figure 2:
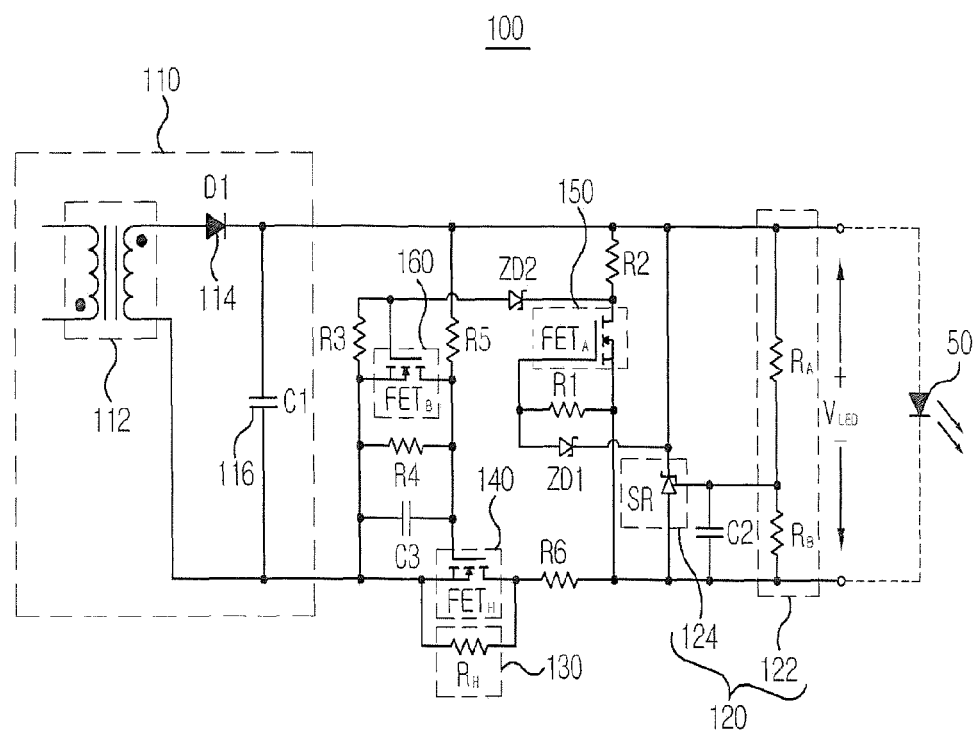
FIG. 2 is a circuit diagram illustrating a power supply apparatus for LED according to an embodiment.

FIG. 2 is a circuit diagram illustrating a power supply apparatus for LED according to an embodiment.

As illustrated in FIG. 2, a power supply apparatus 100 for LED includes a voltage converter 110, a detector 120, a voltage dropper 130, a control switch 140, a first switch 150, and a second switch 160.

The voltage converter 110 shifts a level of an input voltage to output the shifted voltage. That is, the voltage converter 110 shifts the level of the voltage to output the shifted voltage, thereby supplying a power for driving an LED 50.

For this, the voltage converter 110 includes a transformer 112 that induces a voltage, applied to a primary winding, to a secondary winding, a diode (D1) 114 for rectifying voltage induced from the transformer 112, and a first capacitor (C1) 116 for smoothing a voltage rectified by the diode 114.

The detector 120 detects whether the LED 50 is connected to the power supply apparatus 100 for LED. In this case, the detector 120 detects whether the LED 50 is connected with a predetermined reference voltage. That is, the detector 120 detects the LED 50 as not connected to the power supply apparatus for LED when a voltage applied to the LED 50, namely, an output voltage VLED of the power supply apparatus 100 for LED is higher than a first reference voltage Vref1. On the other hand, the detector 120 detects the LED 50 as connected to the power supply apparatus for LED when the output voltage VLED of the power supply apparatus 100 for LED is lower than the first reference voltage Vref1.

As described above, the reason of detecting whether the LED 50 is connected to the power supply apparatus 100 for LED is for determining whether a constant current of the LED 50 is controlled and thus restricting an overcurrent generated until before a constant current of the LED 50 is controlled from a time when the LED 50 is connected to the power supply apparatus 100 for LED.

Therefore, when the constant of the LED 50 is not controlled, the output voltage VLED of the power supply apparatus 100 for LED is maintained higher than the predetermined first reference voltage Vref1. On the other hand, when the constant of the LED 50 is being controlled, the output voltage VLED of the power supply apparatus 100 for LED is maintained lower than the predetermined first reference voltage Vref1. Accordingly, the detector 120 detects the output voltage VLED of the power supply apparatus 100 for LED to determine whether the LED 50 is connected to the power supply apparatus 100 for LED.

Exemplarily, the detector 120 includes a voltage divider 122 and a regulator 124. The voltage divider 122 includes a plurality of resistors RA and RB. The voltage divider 122 divides a voltage (i.e., the output voltage VLED of the power supply apparatus 100 for LED, and hereinafter referred to as a LED voltage) with the resistors RA and RB. The regulator 124 compares the LED voltage divided by the voltage divider 122 and a second reference voltage Vref2, and is turned on/off according to the compared result of the voltages. The voltage divider 122 detects whether the LED 50 is connected to the power supply apparatus 100 for LED, according to an operation of the regulator 124.

The regulator 124 includes a shunt regulator, and when the LED voltage applied to a reference terminal R of the regulator 124 is higher than the second reference voltage Vref2, the regulator 124 is turned on. In this way, when the regulator 124 is turned on, the LED 50 is detected as not connected to the power supply apparatus 100 for LED.

On the other hand, when the LED voltage is lower than the second reference voltage Vref2, the regulator 124 is turned off, and thus detects the LED 50 as connected to the power supply apparatus 100 for LED.

Moreover, a second capacitor C2 is connected in parallel between the regulator 124 and a common node of the resistors RA and RB and removes noise of the LED voltage.

The voltage dropper 130 is connected to the switch 140 in parallel, and when the detector 120 detects the LED 50 as not connected to the power supply apparatus 100 for LED, the voltage dropper 130 drops a voltage applied to the LED 50 in order for a current equal to or lower than a predetermined current to flow in the LED 50. The voltage dropper 130 may be configured with a resistor RH.

The voltage dropper 130 exists on a current flow path until before the constant of the LED 50 is controlled from a time when the LED 50 is connected to the power supply apparatus 100 for LED, and therefore restricts an overcurrent that is momentarily generated in the LED 50.

When the detector 120 detects the LED 50 as not connected to the power supply apparatus 100 for LED, the control switch (FETH) 140 is turned off and allows a rough current to flow into the LED 50 through the voltage dropper 130. Also, when the detector 120 detects the LED 50 as connected to the power supply apparatus 100 for LED, the control switch 140 is turned on to allows a constant current to flow in the LED 50. The control switch 140 is a switching element, and may be implemented with a Bipolar Junction Transistor (BJT) or a Metal-Oxide-Semiconductor Field Effect Transistor (MOSFET).

In an embodiment, the control switch 140 including a MOSFET will be described below as an example.

The first switch (FETA) 150 has a gate terminal connected to a cathode terminal of the regulator 124, and a source terminal connected to a ground terminal GND. The first switch 150 is turned off according to the turned-on of the regulator 124. The first switch 150 may be implemented with a BJT or a MOSFET.

To provide a more detailed description, cathode and anode terminals K and A of the regulator 124 are shorted according to the turned-on of the regulator 124. In this case, the cathode and anode terminals K and A of the regulator 124 have the same low potential, and thus, a voltage applied to the cathode terminal K is decreased.

Then, a voltage of the gate terminal G of the first switch 150 is decreased by the decreased voltage of the cathode terminal K, and since the source terminal S of the first switch 150 is connected to the ground terminal GND, a voltage difference VGS between the gate terminal G and the source terminal S becomes lower than a predetermined voltage, and thus, the first switch 150 is turned off.

On the contrary, when the regulator 124 is turned off, a voltage applied to the cathode terminal K is increased, since the voltage of the gate terminal G of the first switch 150 is increased by the increased voltage of the cathode terminal K, the voltage difference VGS between the gate terminal G and the source terminal S becomes equal to or higher than the predetermined voltage, and thus, the first switch 150 is turned on.

The second switch (FETB) 160 has a gate terminal connected to a drain terminal of the first switch 150, and is turned on according to the turned-off of the first switch 150. The second switch 160 may be implemented with a BJT or a MOSFET.

To provide a more detailed description on the operation, when the first switch 150 is turned off, since a voltage difference VGS between the gate terminal and source terminal of the second switch 160 becomes equal to or higher than a predetermined voltage, the second switch 160 is turned on.

Furthermore, the gate terminal G and source terminal S of the second switch 160 are shorted according to the turned-on of the second switch 160, and thus, since a voltage difference VGS between the gate terminal and source terminal of the control switch 140 becomes lower than a predetermined voltage, the control switch 140 is turned off.

At this point, when the LED 50 is connected to the power supply apparatus 100 for LED, the control switch 140 is turned off in order for a current not to flow, and thus, a current equal to or lower than a predetermined current is applied to the LED 50 through a line connected to the voltage dropper 130.

When the first switch 150 is turned on, the second switch 160 is turned off because the voltage difference VGS between the gate terminal and source terminal of the second switch 160 becomes lower than a predetermined voltage, and the control switch 140 is turned on because the voltage difference VGS between the gate terminal and source terminal of the control switch 140 becomes equal to or higher than a predetermined voltage.

Then, a current flows into the control switch 140 instead of the voltage dropper 130, and thus, a constant current flows in the LED 50.

Hereinafter, the power supply apparatus for LED according to an embodiment will be described.

First, the detector 120 detects whether the LED 50 is connected to the power supply apparatus 100 for LED to control the constant current of the LED 50.

That is, when the LED voltage divided by the voltage divider 122 is higher than the second reference voltage Vref2, the detector 120 detects the LED 50 as not connected to the power supply apparatus 100 for LED. On the contrary, when the LED voltage is lower than the second reference voltage Vref2, the detector 120 detects the LED 50 as connected to the power supply apparatus 100 for LED.

When the LED 50 is not connected to the power supply apparatus 100 for LED, since the LED voltage is higher than the second reference voltage Vref2, the regulator 124 is turned on. When the regulator 124 is turned on, since the cathode terminals K and anode terminals A of the regulator 124 are shorted and thus the cathode terminal K has a low potential equal to a potential of the anode terminal A, a voltage applied to the cathode terminal K is decreased.

Furthermore, since the gate terminal G of the first switch 150 is connected to the cathode terminal K of the regulator 124 and the source terminal S of the first switch 150 is connected to the ground terminal GND, the voltage difference VGS between the gate terminal G and the source terminal S becomes lower than a predetermined voltage by the decreased voltage of the cathode terminal K, and thus, the first switch 150 is turned off.

The voltage difference VGS between the gate terminal G and source terminal S of the second switch 160 becomes equal to or higher than a predetermined voltage according to the turned-off of the first switch 150 and thus the second switch 160 is turned on, and the gate terminal G and source terminal S of the second switch 160 are shorted according to the turned-on of the second switch 160 and thus the voltage difference VGS between the gate terminal G and source terminal S of the control switch 140 becomes lower than a predetermined voltage. Therefore, the control switch 140 is turned off.

At this point, when the LED 50 is connected to the power supply apparatus 100 for LED, since the control switch 140 is in a turned-off state, a current flows into a line connected to the voltage dropper 130, and thus, a current controlled to lower than a predetermined current is applied to the LED 50 through the voltage dropper 130.

Therefore, by the above-described operation, an overcurrent applied to the LED 50 can be restricted until before the LED 50 is connected to the power supply apparatus 100 for LED and the constant of the LED 50 is controlled.

When the LED 50 is connected to the power supply apparatus 100 for LED and then the constant of the LED 50 is controlled after a certain time elapses, the regulator 124 is turned off because the LED voltage becomes lower than the second reference voltage Vref2.

Then, the voltage difference VGS between the gate terminal G and source terminal S of the first switch 150 becomes equal to or higher than a predetermined voltage according to the turned-off of the regulator 124, and thus, the first switch 150 is turned on. The voltage difference VGS between the gate terminal G and source terminal S of the second switch 160 becomes lower than a predetermined voltage according to the turned-on of the first switch 150, and thus, the second switch 160 is turned off.

Furthermore, the voltage difference VGS between the gate terminal G and source terminal S of the control switch 140 becomes equal to or higher than a predetermined voltage according to the turned-off of the second switch 160, and thus, the control switch 140 is turned on and a current flows into the LED 50 instead of the voltage dropper 130 through the control switch 160. Therefore, a constant current that is obtained by controlling the constant current of the LED 50 is applied to the LED 50 through the control switch 140.

To provide a summary on the above description, the power supply apparatus 100 compensates for a low impedance of the LED 50 to an impedance equal to or higher than a predetermined impedance until before the constant current of the LED 50 is controlled from a time when the LED 50 is connected thereto, thereby allowing a current equal to or lower than a predetermined current to flow in the LED 50. Also, when the constant current of the LED 50 is controlled after a certain time elapses, by allowing a current to flow through the control switch 140, a controlled current can flow.

According to the power supply apparatus for LED, As described above, by compensating for a low impedance of the LED 50 to an impedance equal to or higher than a predetermined impedance until before the constant current of the LED 50 is controlled from a time when the LED 50 is connected to the power supply apparatus 100 for LED, an overcurrent can be inhibited from flowing in the LED 50.

That is, the power supply apparatus 100 for LED allows a current equal to or lower than a predetermined current to flow in the LED 50 through a line connected to the voltage dropper until before the constant of the LED 50 is controlled from a time when the LED 50 is connected thereto, and allows a constant current to flow into the LED 50 through a line connected to the switch when the constant current of the LED 50 is controlled. Thus, the power supply apparatus 100 for LED can solve a limitation that an overcurrent is momentarily generated and damages the LED 50.

Accordingly, the service life of the LED 50 can be extended, and the damage of the power supply apparatus for LED can be inhibited.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply apparatus for a light emitting diode (LED) comprising:
   a voltage converter configured to shift a level of an input voltage, and to apply the shifted voltage to the LED, wherein the voltage converter includes a transformer having a primary winding and a secondary winding;
   a detector connected to an output terminal of the voltage converter, and configured to detect whether the LED is connected to the power supply apparatus by using the shifted voltage;
   a voltage dropper formed between the voltage converter and the LED, and configured to drop a voltage applied to the LED; and
   a control switch connected to the voltage dropper in parallel, and configured to change a path of a power applied to the LED according to the detected result of the detector;
   wherein the path of the power comprises a first path comprising the voltage dropper, and a second path comprising no voltage dropper.

2. The power supply apparatus according to claim 1, wherein
   the control switch is selectively turned on or off according to the detected result of the detector and changes the path of the power applied to the LED.

3. The power supply apparatus according to claim 1, wherein the detector compares the voltage applied to the LED and a predetermined first reference voltage to detect whether the LED is connected.

4. The power supply apparatus according to claim 3, wherein,
   the detector detects the LED as connected when the voltage applied to the LED is higher than the predetermined first reference voltage, or
   the detector detects the LED as not connected when the voltage applied to the LED is lower than the predetermined first reference voltage.

5. The power supply apparatus according to claim 1, wherein the detector comprises:
   a voltage divider configured to divide the voltage applied to the LED; and
   a regulator configured to compare the divided voltage and a second reference voltage to detect whether the LED is connected according to the compared result of the voltages.

6. The power supply apparatus according to claim 5, wherein,
   the regulator is turned on when the LED is detected as connected, or
   the regulator is turned off when the LED is detected as not connected.

7. The power supply apparatus according to claim 6, wherein,
   the regulator is turned on when the divided voltage is higher than the second reference voltage, and
   the control switch is turned off according to the turned-on of the regulator and allows a current, flowing through a path comprising the voltage dropper, to flow into the LED.

8. The power supply apparatus according to claim 6, wherein,
   the regulator is turned on when the divided voltage is lower than the second reference voltage, and
   the control switch is turned on according to the turned-off of the regulator and allows a current, flowing through a path comprising the control switch, to flow into the LED.

9. The power supply apparatus according to claim 6, further comprising:
   a first switch having a gate terminal connected to a cathode terminal of the regulator, and a source terminal connected to a ground terminal; and
   a second switch having a gate terminal connected to a drain terminal of the first switch.

10. The power supply apparatus according to claim 9, wherein,
    the first switch is turned off according to the turned-on of the regulator,
    the second switch is turned on according to the turned-off of the first switch, and
    the control switch is turned off according to the turned-on of the second switch and a current, which flows through a path comprising the voltage dropper, is applied to the LED.

11. The power supply apparatus according to claim 9, wherein,
    the first switch is turned on according to the turned-off of the regulator, the second switch is turned off according to the turned-on of the first switch, and the control switch is turned on according to the turned-off of the second switch and a current, which flows through a path comprising the control switch, is applied to the LED.

* * * * *